R. D. WEBB.
METHOD OF RE-FORMING AND COMPRESSING BALES OF COTTON.
APPLICATION FILED JAN. 31, 1916.
1,257,559.
Patented Feb. 26, 1918.
2 SHEETS—SHEET 1.
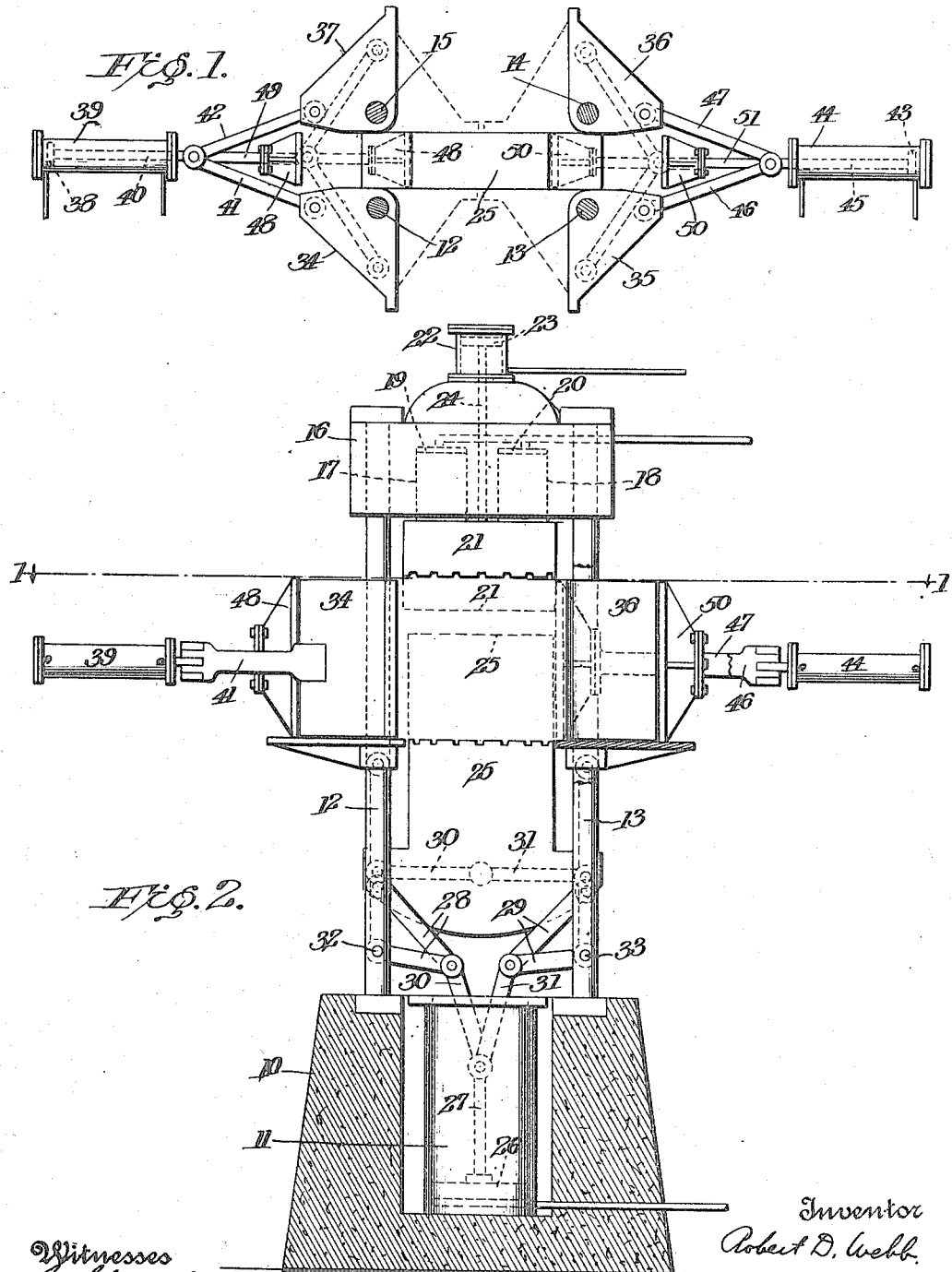

R. D. WEBB.
METHOD OF RE-FORMING AND COMPRESSING BALES OF COTTON.
APPLICATION FILED JAN. 31, 1916.
1,257,559.
Patented Feb. 26, 1918.
2 SHEETS—SHEET 2.
Fig. 3.
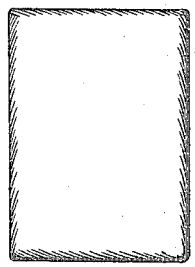
Fig. 4.
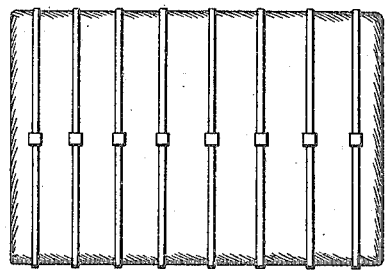
Fig. 5.
Fig. 6.
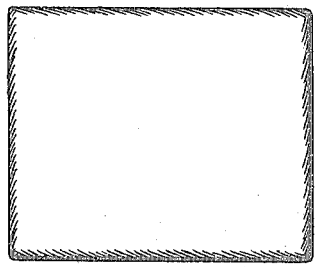
Fig. 7.
Fig. 8.
Fig. 9.
Fig. 10.
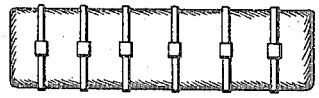
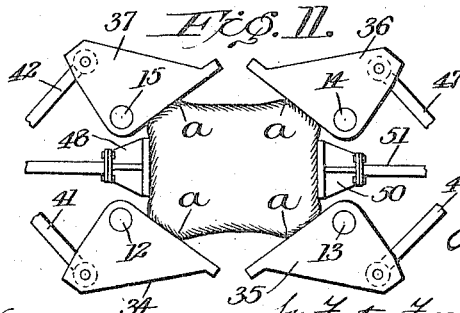
Inventor
Robert D. Webb.
by Foster, Freeman, Watson & Coit
Attorneys
Witnesses
G. T. Baker.
H. P. Jennings.

UNITED STATES PATENT OFFICE.

ROBERT D. WEBB, OF MINDEN, LOUISIANA.

METHOD OF RE-FORMING AND COMPRESSING BALES OF COTTON.

1,257,559.            Specification of Letters Patent.      Patented Feb. 26, 1918.

Application filed January 31, 1916. Serial No. 75,416.

*To all whom it may concern:*

Be it known that I, ROBERT D. WEBB, a citizen of the United States, and resident of Minden, Webster parish, State of Louisiana, have invented certain new and useful Improvements in Methods of Re-Forming and Compressing Bales of Cotton, of which the following is a specification.

This invention relates to methods of reforming and compressing bales of cotton or other material and has for its object to provide a method of compressing which will produce a better and more attractive bale in which excessive irregular compacting of the cotton is avoided, the cotton being compressed substantially uniformly throughout the bale.

It is the practice in cotton districts to have at centrally located points compressing plants which take the bales, as they are formed on the plantations or at the gins, and compress them into much smaller sizes in order to take up less space on board cars and ships and at the warehouses, docks, etc. Methods of compressing which have been heretofore employed have been objectionable on account of the extreme pressure used on final compression of the bale being applied while its sides are confined between the side pressure plates, thereby pressing the bagging or covering into the edges or layers of cotton so that it is difficult to remove the same, and also leaving the central portions of the sides of the bale exposed, and also causing the edges of the layers of cotton that come into contact with the side plates to rub against the same so hard and to be compressed so tightly that these edges are rendered very smooth; in many instances so smooth and hard that it is almost possible to write upon them with a pencil. These are objectionable features and produce waste. It has also been the practice to press the bales in from the end at the same time that they are being pressed in from the sides practically at right angles to the end pressures, and this results in making what is called "cross packing" and causes a larger proportion of the cotton of the bale to be accumulated at or near the ends of the bale, so that the ends have a much higher density than the other portions of the bale. One of the reasons why there is a serious objection to having the cotton most dense at the ends of the bale is that the ends are the parts that are most frequently damaged, or are in damaging condition when compressed.

However, it is frequently desirable to press the bales in from the ends for the purpose of making a shorter and more uniform bale than would otherwise result, and it will be seen that with the present invention the pressing of the ends of the bales is accomplished progressively while the sides of the bale are being progressively pressed in from its end corners toward its center, thus causing the cotton to flow freely from the end of the bale toward the center, eliminating the objections which have heretofore accompanied the pressing of the ends of the bale.

In the accompanying drawings I have illustrated in a general way means whereby my improved method may be carried out. In these drawings, Figure 1 is a section on the line 1—1 of Fig. 2;

Fig. 2 is a side elevation;

Figs. 3 and 4 are, respectively, end and side elevations of a bale before being compressed;

Figs. 5 and 6 are, respectively, end and side elevations of the bale after the first operation;

Figs. 7 and 8 are, respectively, end and side elevations of the bale after the second operation;

Figs. 9 and 10 are, respectively, end and side elevations of the bale after the final operation; and Fig. 11 is a diagrammatic view showing one mode of operation of the side and end pressure doors.

The method of reforming and compressing bales which I employ consists in first pressing the sides of the bale in progressively from its end corners and then pressing it in from the end while completing the side pressing; then lightly compressing it in a direction substantially at right angles to the first pressing, sufficiently to cause the reassembled and reformed bale to retain its reformed shape after the pressure has been removed from the sides and ends of the bale, while the pressure of the first compressing is maintained; then removing the side and end confining plates; and then making a further and final heavy compression in the direction of the last compression. In the apparatus illustrated in Figs. 1 and 2, 10 indicates any suitable foundation which supports the pressure cylinder 11 and the rods 12, 13, 14 and 15. These rods carry at their upper ends a housing 16 containing the cylinders 17 and 18 in which are arranged plungers 19 and 20 respectively. A platen 21 is rigidly connected with and actuated by the plungers 19 and 20. A cylinder 22 is also arranged on the housing 16 and contains a piston 23, which is connected with the platen 21 by a rod 24, for the purpose of returning the platen after the completion of the compression movement. A lower platen 25 is suitably guided and actuated by a piston 26 in the cylinder 11, the piston having a rod 27 which is connected with pairs of toggle links 28 and 29 by the links 30 and 31 respectively. The lower link of each of the pairs 28 and 29 has a fixed pivot as indicated at 32 and 33, and the upper link of each pair is pivotally connected with the platen 25. Side doors or displacing plates 34, 35, 36 and 37 are pivoted on the rods 12, 13, 14 and 15, respectively, and swung from the full line positions shown in Fig. 1 to the dotted line positions to progressively press the bale laterally. The doors 34 and 37 are actuated by a piston 38 in the cylinder 39, the piston being connected with the doors by means of a rod 40 and links 41 and 42. The doors 35 and 36 are similarly actuated by a piston 43 in the cylinder 44, the piston being connected with the doors by the rod 45 and links 46 and 47. A plate 48 is connected with the rod 40 by means of a suitable rod 49 and is actuated by the piston 38, in connection with the doors 34 and 37, to press one end of the bale. A similar plate 50 is connected with the rod 45 by a suitable rod 51 and is actuated by the piston 43, in connection with the doors 35 and 36, to press the opposite end of the bale, these end pressures being applied progressively during the time the side doors are progressively pressing in the sides of the bale.

In the operation of the apparatus the parts are first arranged as shown in full line in Figs. 1 and 2 and the bale is placed on the platen 25. The pistons 38 and 43 are then actuated to swing the side doors 34, 35, 36 and 37, and to move the end pressing plates 48 and 50 against the bale to make it narrower and shorter. When the doors 34, 35, 36 and 37 have reached the dotted line position shown in Fig. 1, the plates 48 and 50 will have reached the dotted line position, and the bale will have been reformed to substantially the shape indicated in Figs. 5 and 6. The doors and end plates are maintained in these positions while the platen 25 is moved upward, pressure being admitted to the under side of piston 26 to actuate the platen. In this way the bale is lightly compressed in a direction at right angles to the first pressing, and after the platen 25 has completed its upward movement the bale will have assumed substantially the shape indicated in Figs. 7 and 8, and it has been compressed sufficiently for it to retain its reassembled form; the doors 34, 35, 36 and 37 and the plates 48 and 50 are then withdrawn so as to relieve the bale of the lateral pressures. The platen 21 is then forced down to the dotted line position, in Fig. 2, thereby giving the bale its final heavy compression and producing substantially the shape indicated in Figs. 9 and 10, without having the cotton rubbed along the doors 34, 35, 36 and 37 or the end plates 48 and 50 during the final heavy compression act. After the compression movement of the platen 25 the density of the bale is such that it will retain its reassembled shape without the confining plates on the sides and ends. If the platen 21 were actuated and the final heavy compression pressure applied while the side doors and end plates confined the bale it would crowd the bagging or covering against the bale and mash it into the edges of the layers of the cotton on the sides and ends of the bale. There would also be a tendency to smooth and harden the cotton at the edges of the layers, along the sides and ends of the bale, and hence by removing the doors 34, 35, 36 and 37 and the plates 48 and 50 before the final heavy compression these difficulties which have attended the process of compression heretofore employed are eliminated.

After the completion of the compression movement of the platen 21 the bale is tied or banded as in Fig. 10 or in the usual way and the platen 21 is lifted by the piston 23, and the platen 25 lowered to its original position, and the bale removed from the platen 25 and another bale placed in position thereon.

Referring to Fig. 11 it will be seen that the doors first act upon the sides of the bale at the corners of same, and the pressure is applied to the sides of the bale progressively from the end corners toward the middle of the lateral sides, and that while this pressure is being progressively applied to the sides of the bale the plates 48 and 50 move up and engage the ends of the bale thus coöperating with the side doors progressively to completely reassemble the cotton in the bale. In applying the initial pressure in this way in reforming the bale the cotton is pushed toward the middle of the bale, as in the manner indicated at the points $a$, in Fig. 11, and in this way a greater uniformity of cotton and density throughout the bale is secured.

From the foregoing it will be evident that this improved method of compressing may be carried out with rapidity and uniformity, and while the apparatus which I have shown is adapted to carry out the improved method, other forms of apparatus may be employed.

Having thus described my invention, what I claim is:

1. The method substantially as hereinbefore set forth of compressing bales which have been previously formed under pressure, which consists in first pressing the bale simultaneously on four sides thereof, then compressing the bale in a direction substantially at right angles to the first pressures while the first pressures are maintained, then removing the pressures of the first pressing, and then further compressing the bale in the direction of the last compression.

2. The method substantially as hereinbefore set forth of compressing bales which have been previously formed under pressure, which consists in first pressing the bale on its ends and two of its sides, then compressing the bale in a direction substantially at right angles to the directions of the first pressings while the pressures of the first pressings are maintained, then removing the pressures of the first pressing and then further compressing the bale in the direction of the last compression.

3. The method substantially as hereinbefore set forth, of compressing bales which have been previously formed under pressure which consists in first pressing the bale simultaneously on its ends and two of its sides, then compressing the bale in a direction substantially at right angles to the first pressing sufficiently, while the pressures in the direction of the first pressings are maintained, to make it retain its reformed shape after said pressures are removed, then removing the pressures of the first pressings, and then further compressing the bale in the direction of the last compression.

4. The method substantially as hereinbefore set forth, of compressing bales which have been previously formed under pressure, which consists in first pressing the ends of the bale while simultaneously pressing the bale on two of its sides progressively from the ends to the middle of the bale, then compressing the bale in a direction substantially at right angles to the directions of the first pressings while the pressures of the first pressings are maintained, then removing the pressures of the first pressings, and then further compressing the bale in the direction of the last compression.

5. The method substantially as hereinbefore set forth, of reforming bales, that have been previously formed under pressure, prior to final compression, which consists of first pressing the bale on the sides and ends, making it narrower and shorter, then compressing the bale while confined between these side and end pressers sufficiently to make it hold its reformed shape after these side and end pressers have been removed, and then removing the side and end pressers prior to the final compression act.

6. The method substantially as hereinbefore set forth of reforming bales, that have been previously formed under pressure, prior to final compression, which consists of first pressing the bale on its sides and ends progressively from its end corners toward its middle, making it narrower and shorter, then compressing the bale while confined between these sides and end pressers sufficiently to make it hold its reformed shape after these side and end pressers have been removed, then removing the side and end pressers prior to the final compression act.

7. The method substantially as hereinbefore set forth, of reforming plantation or gin house bales of cotton prior to final compression, which consists of first pressing the bale in two directions, then compressing the bale in a direction substantially at right angles to the first pressures sufficiently, while the pressures in the first directions of pressings is maintained, to make it hold its reformed shape after the first pressures have been removed, then removing the pressures of the first pressings, leaving the bale reformed prior to the final compression pressure.

8. The method substantially as hereinbefore set forth, of reforming and compressing bales that have been previously formed under pressure, which consists in first pressing the bale on its ends and sides to make it narrower and shorter, then compressing the bale while confined between the side and end pressers at substantially right angles to the first pressure sufficiently to make it hold its reformed shape after the first pressers have been removed, then removing the side and end pressers, leaving the bale reformed, then applying the final compression pressure in the direction of the last compression.

In testimony whereof I affix my signature.

ROBT. D. WEBB.